United States Patent
Redfern

(10) Patent No.: US 8,868,109 B1
(45) Date of Patent: Oct. 21, 2014

(54) NAVIGATING WITH A CAMERA DEVICE

(71) Applicant: LinkedIn Corporation, Mountain View, CA (US)

(72) Inventor: Joff Redfern, Truckee, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/012,247

(22) Filed: Aug. 28, 2013

Related U.S. Application Data

(60) Provisional application No. 61/806,354, filed on Mar. 28, 2013.

(51) Int. Cl.
*H04W 24/00* (2009.01)

(52) U.S. Cl.
USPC ............. 455/456.3; 455/456.1; 455/456.2; 455/456.5; 455/456.6; 455/414.1

(58) Field of Classification Search
USPC .................. 455/456.3–456.5, 414.1
See application file for complete search history.

(56) References Cited

U.S. PATENT DOCUMENTS

2012/0158297 A1* 6/2012 Kim et al. ............. 701/516
2013/0244624 A1* 9/2013 Das et al. ............. 455/414.1

* cited by examiner

*Primary Examiner* — Michael T Vu
(74) *Attorney, Agent, or Firm* — Schwegman Lundberg & Woessner, P.A.

(57) ABSTRACT

A navigation system and method are described. A destination may be determined for a user. A starting location may be determined for the user using data obtained via a mobile device of the user. The user may be enabled to establish a route from the starting location to the destination using the mobile device. Route information that details the established route may be stored in a database for subsequent display to other users. In some embodiments, a value total for each user may be stored, and value may be added to the user's value total in response to the user establishing the route from the starting location to the destination.

18 Claims, 15 Drawing Sheets

| DESTINATION ROUTE INFORMATION 260 | | | |
|---|---|---|---|
| Destination | Starting Location | Route | Pioneer |
| Destination A | (none) | (none) | (none) |
| Destination B | Starting Location B | Route B | User B |
| Destination C | Starting Location C<br>Starting Location D<br>Starting Location D | Route C<br>Route D<br>Route E | User C<br>User C<br>User E |

*FIG. 3*

| USER INFORMATION 270 | |
|---|---|
| User | Pioneering Points |
| User A | 0 |
| User B | 5 |
| User C | 10 |
| User D | 0 |
| User E | 5 |

*FIG. 4*

| LOCATION IMAGE INFORMATION 280 | |
|---|---|
| Location | Images of Location |
| Location A | Image 1 |
| Location B | (none) |
| Location C | Image 2, Image 3 |
| Location D | Image 4 |
| Location E | Image 5, Image 6, Image 7 |

*FIG. 5*

NAVIGATING WITH A CAMERA DEVICE

CROSS-REFERENCE TO RELATED APPLICATIONS

This application claims priority to U.S. Provisional Application No. 61/806,354, filed on Mar. 28, 2013, and entitled, "NAVIGATING WITH A CAMERA DEVICE," which is hereby incorporated by reference in its entirety as if set forth herein.

TECHNICAL FIELD

This application relates generally to the technical field of navigation systems, and, in one specific example, to navigating using a mobile device.

BACKGROUND

Current navigation systems do not adequately help a user navigate his or her way through a building. Additionally, current navigation systems do not use social crowdsourcing to help build and update navigation information.

BRIEF DESCRIPTION OF THE DRAWINGS

Some embodiments are illustrated by way of example and not limitation in the figures of the accompanying drawings, in which like reference numbers indicate similar elements, and in which:

FIG. 3 illustrates destination route information that may be stored in a database, in accordance with an example embodiment;

FIG. 4 illustrates user information that may be stored in a database, in accordance with an example embodiment;

FIG. 5 illustrates location image information that may be stored in a database, in accordance with an example embodiment;

DETAILED DESCRIPTION

Figure 1:
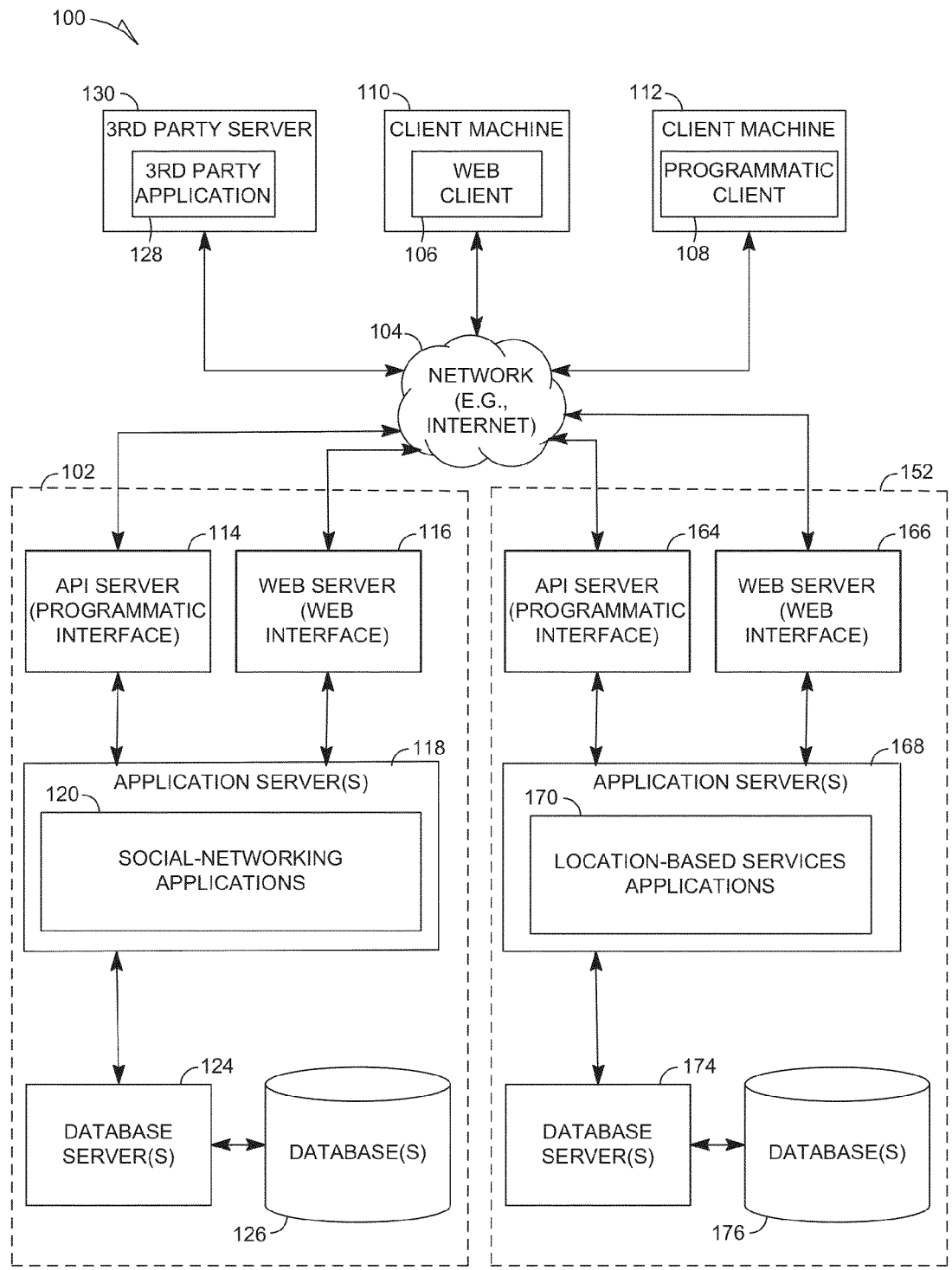
FIG. 1 is a network diagram depicting a client-server system, within which various example embodiments may be deployed.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of navigation. In some embodiments, the features disclosed herein may help a user navigate his or her way through a building. In some embodiments, the features disclosed herein may use social crowdsourcing to help build and update navigation information. While the features disclosed herein are particularly useful for indoor navigation (e.g., from starting location within an office building to a destination within the same office building), it is contemplated that outdoor navigation is also within the scope of the present disclosure.

In some embodiments, the term "location" may be interpreted to include a predetermined vicinity of a location point. For example, a mobile device may be determined to be at or in the location of the conference room if it is determined that the mobile device is within a certain radius (e.g., thirty feet) of the center of the conference room.

In some embodiments, the term "user" is used herein to refer to a person that uses a service and is different from an administrator of the service. For example, a user of a social media website service is not an employee or agent of the social media website service. In this fashion, the user may be one of many users that are used in the crowdsourcing aspects of the present disclosure.

In some embodiments, method may comprise determining a destination for a user, determining a starting location for the user using data obtained via a mobile device of the user, enabling, by at least one processor, the user to establish a route from the starting location to the destination using the mobile device, and storing route information that details the established route in a database for subsequent display to other users.

In some embodiments, the method may further comprise storing a value total for each user, and adding value to the user's value total in response to the user establishing the route from the starting location to the destination.

In some embodiments, determining the starting location of the user may comprise receiving image data from the mobile device, comparing the received image data with stored image data corresponding to a stored location, and determining that the stored location is the starting location based on a measure of similarity between the received image data and the stored image data.

In some embodiments, enabling the user to establish the route may comprise tracking movement of the mobile device as the mobile device moves from the starting location to the destination, receiving image data from the mobile device, the image data being obtained by the mobile device between the starting location and the destination, determining an image location corresponding to where the received image data was obtained by the mobile device, and storing the received image data and the determined image location in the database. In some embodiments, the movement of the mobile device may be tracked using at least one of a WiFi positioning system, an accelerometer on the mobile device, and an altimeter on the mobile device. In some embodiments, the method further comprises causing the route information to be displayed on another user's mobile device, tracking movement of the other user's mobile device as the other user's mobile device moves from the starting location to the destination, determining that the other user's mobile device is proximate the image location, and causing the image data corresponding to the image location to be displayed on the other user's mobile device in response to the determination that the other user's mobile device is proximate the image location. In some embodiments, the method may further comprises causing the route information to be displayed on another user's mobile device, tracking movement of the other user's mobile device as the other user's mobile device moves from the starting location to the destination, and causing the image data corresponding to the image location to be displayed along with a notification prior to the other user's mobile device arriving at the image location as the other user's mobile device moves from the starting location to the destination. The notification may be configured to notify the other user that the image data represents a view that will be viewable to the other user along the route from the starting location to the destination.

In some embodiments, the destination may be inside a building, and the starting location is inside the building. In some embodiments, the mobile device may be a mobile phone having a built-in camera device.

In some embodiments, a system may comprise a memory, at least one processor coupled to the memory, and a navigation module executable by the processor(s). Than navigation module may be configured to determine a destination for a user, determine a starting location for the user using data obtained via a mobile device of the user, enable the user to establish a route from the starting location to the destination using the mobile device, and store route information that details the established route in a database for subsequent display to other users.

In some embodiments, the navigation module may be further configured to store a value total for each user, and add value to the user's value total in response to the user establishing the route from the starting location to the destination.

In some embodiments, determining the starting location of the user may comprise receiving image data from the mobile device, comparing the received image data with stored image data corresponding to a stored location, and determining that the stored location is the starting location based on a measure of similarity between the received image data and the stored image data.

In some embodiments, enabling the user to establish the route may comprise tracking movement of the mobile device as the mobile device moves from the starting location to the destination, receiving image data from the mobile device, the image data being obtained by the mobile device between the starting location and the destination, determining an image location corresponding to where the received image data was obtained by the mobile device, and storing the received image data and the determined image location in the database. In some embodiments, the movement of the mobile device may be tracked using at least one of a WiFi positioning system, an accelerometer on the mobile device, and an altimeter on the mobile device. In some embodiments, the navigation module may be further configured to cause the route information to be displayed on another user's mobile device, track movement of the other user's mobile device as the other user's mobile device moves from the starting location to the destination, determine that the other user's mobile device is proximate the image location, and cause the image data corresponding to the image location to be displayed on the other user's mobile device in response to the determination that the other user's mobile device is proximate the image location. In some embodiments, the navigation module may be further configured to cause the route information to be displayed on another user's mobile device, track movement of the other user's mobile device as the other user's mobile device moves from the starting location to the destination, and cause the image data corresponding to the image location to be displayed along with a notification prior to the other user's mobile device arriving at the image location as the other user's mobile device moves from the starting location to the destination, the notification being configured to notify the other user that the image data represents a view that will be viewable to the other user along the route from the starting location to the destination.

In some embodiments, the destination may be inside a building, and the starting location is inside the building. In some embodiments, the mobile device may be a mobile phone having a built-in camera device.

The methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

FIG. 1 is a network diagram depicting a client-server system 100, within which various example embodiments may be deployed. A networked system 102, in the example forms of a social-networking system or other communication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112. Each of the one or more clients 106, 108 may include a software application module (e.g., a plug-in, add-in, or macro) that adds a specific service or feature to a larger system.

Within the networked system 102, an API server 114 and a web server 116 are coupled to, and provide programmatic and web interfaces respectively to, one or more application servers 118. The application servers 118 host one or more social-networking application(s) 120. The application servers 118 are, in turn, shown to be coupled to one or more databases servers 124 that facilitate access to one or more databases or NoSQL or non-relational data stores 126.

An additional networked system 152, in the example forms of a location-based services system or other communication system, provides server-side functionality, via a network 104 to the one or more clients.

Within the networked system 152, an API server 164 and a web server 166 are coupled to, and provide programmatic and web interfaces respectively to, one or more application servers 168. The application servers 168 host one or more applications (e.g., location-based services application(s) 170). The application servers 168 are, in turn, shown to be coupled to one or more databases servers 174 that facilitate access to one or more databases or NoSQL or non-relational data stores 176. In various embodiments, the location-based services application(s) 170 are configured to receive information on the geographical position of a mobile device. Thus, for example, the location-based services applications may receive and transmit data pertaining to the location of a user carrying a mobile device during a commute of the user from a first location to a second location. A mobile device may be any device that is capable of being carried around. Examples of mobile devices may include a laptop computer, a tablet computer (e.g., an iPad), a mobile or smart phone (e.g., an iPhone), a smartwatch (e.g., a Pebble E-Paper Watch), an augmented reality head-mounted display (e.g., Google Glass), and so on.

The applications 120 and 170 may provide a number of functions and services to users who access the networked systems 102 and 152. While the applications are shown in FIG. 1 to form part of the networked systems 102 and 152, in alternative embodiments, the applications may form part of a service that is separate and distinct from the networked systems 102 and 152.

Further, while the system 100 shown in FIG. 1 employs a client-server architecture, various embodiments are, of course, not limited to such an architecture, and could equally well find application in a distributed, or peer-to-peer, architecture system, for example. The various applications could also be implemented as standalone software programs, which do not necessarily have computer networking capabilities. Additionally, although FIG. 1 depicts machines 130, 110, and 112 as being coupled to a networked system 102 and networked system 152, it will be readily apparent to one skilled in the art that machines 130, 110, and 112, as well as client 128, 106, and 108, may be coupled to multiple additional networked systems. For example, the clients 128, 106, and 108 may be coupled to multiple applications, such as applications 120 and 170.

The web client 106 accesses the various applications 120 and 170 via the web interface supported by the web server 116 or the web server 166 respectively. Similarly, the programmatic client 108 accesses the various services and functions provided by the applications 120 and 170 via the programmatic interface provided by the API server 114 and API server 164, respectively. The programmatic client 108 may, for example, perform batch-mode communications between the programmatic client 108 and the networked systems 102 and 152.

FIG. 1 also illustrates a third party application 128, executing on a third party server machine 130, as having programmatic access to the networked systems 102 and 152 via the programmatic interface provided by the API server 114 and the API server 164, respectively. For example, the third party application 128 may, utilizing information retrieved from the networked systems 102 and 152, support one or more features or functions on a website hosted by the third party. The third party website may, for example, provide one or more social-networking functions that are supported by the relevant applications of the networked system 102.

Figure 2:
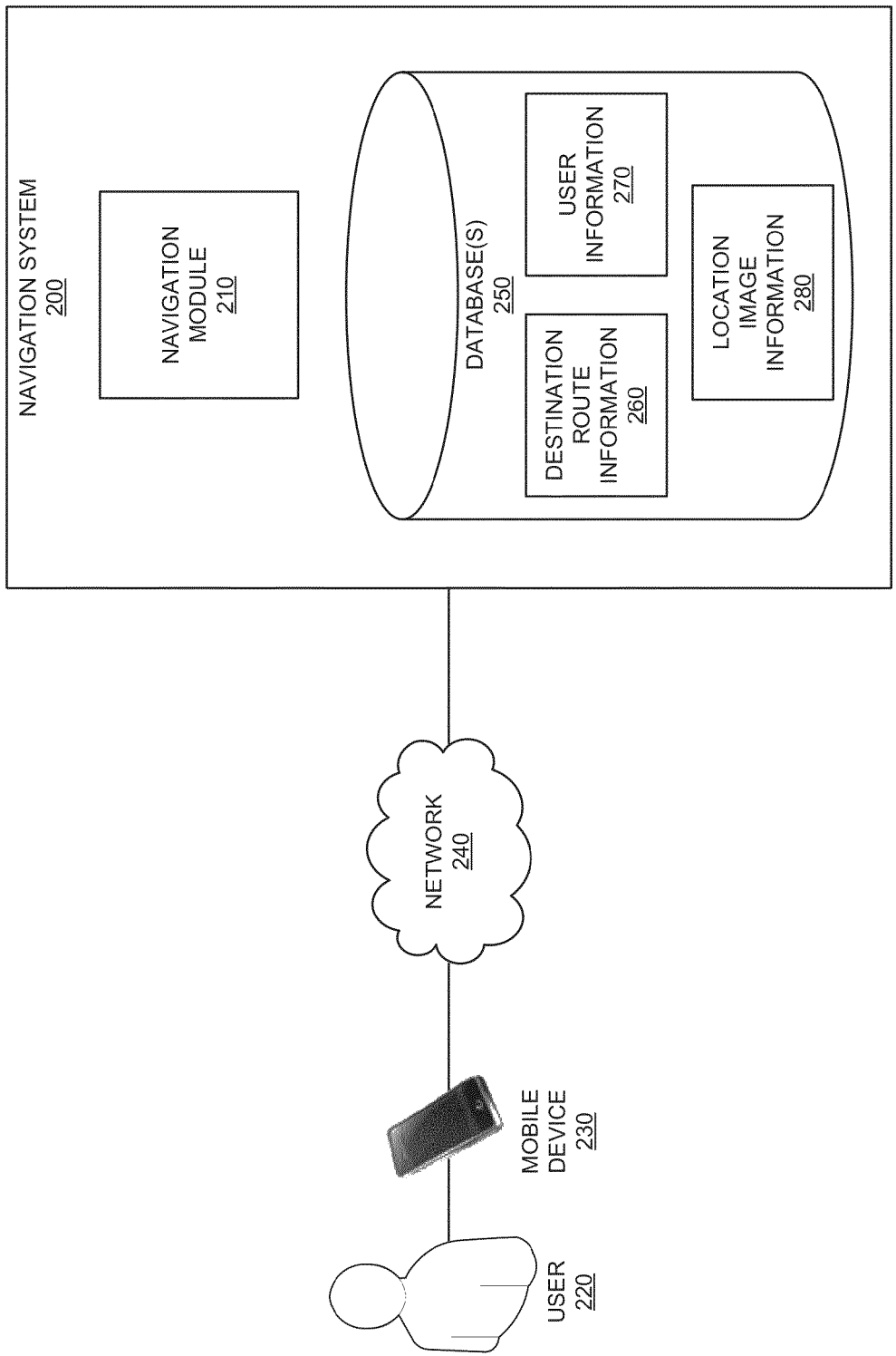
FIG. 2 is a navigation system, in accordance with an example embodiment.

FIG. 2 is a navigation system 200, in accordance with an example embodiment. The navigation system 200 may a navigation module 210 and one or more databases 250. In some embodiments, the navigation module 210 may reside on the application server(s) 118 and/or the application server(s) 168 in FIG. 1, and the database(s) 250 may be incorporated into the database(s) 126 and/or the database(s) 176 in FIG. 1. However, it is contemplated that other configurations are within the scope of the present disclosure.

In some embodiments, the navigation system 200 may be used for different environments in different scenarios. For example, the navigation system 200 may be used to navigate through an office building of a company in one scenario, and may be used to navigate through a classroom building of a university in another scenario. As previously mentioned, the navigation system 200 may be used for indoor navigation. However, it is contemplated that the navigation system 200 may also be used for outdoor navigation purposes.

In some embodiments, the navigation module 210 may use social crowdsourcing to build and update a library of navigation routes that may be presented to users 220 for aide in navigating to a location. The navigation module 210 may solicit and/or obtain destination route information 260 from users 220 and then store this destination route information 260 in database(s) 250, as will be discussed in further detail below. Destination route information 260 obtained from one user 220 may then be provided to other users 220.

In some embodiments, users 220 may communicate with components of the navigation system 200 using mobile devices 230. The mobile devices 230 may have telecommunications capability. Examples of mobile devises 230 include, but are not limited to, mobile phones (e.g., a smartphone), personal digital assistants, and tablet computers. It is contemplated that other types of mobile devices 230 are also within the scope of the present disclosure. The mobile devices 230 may communicate with the navigation system 200 via a communication network 240. Examples of communication networks include, but are not limited to, a LAN, a WAN, the Internet, mobile telephone networks, and wireless data networks (e.g., WiFi and WiMAX networks). It is contemplated that other types of communication networks 240 are also within the scope of the present disclosure.

In some embodiments, the navigation module 210 may be configured to determine a destination for a user 220. The destination may be determined in a variety of ways. In some embodiments, the destination may be determined from an electronic calendar event from calendaring software. For example, an appointment may be set up on Microsoft Outlook for a user 220 to meet a colleague in a particular location at a particular time. Identification of this meeting location may be obtained by the navigation module 210 and used as the destination for the user 220. In some embodiments, a user 220 may enter, select, or otherwise provide identification of the destination to the navigation module 210 via the mobile device 230. It is contemplated that the destination may be determined in other ways as well.

The navigation module 210 may also be configured to determine a starting location for the user 220. In some embodiments, the starting location may be entered, selected, or otherwise provided by the user 220 via the mobile device 230. In some embodiments, the starting location may be determined by the navigation module 210 using data obtained via the mobile device 230. For example, the navigation module 210 may use Global Positioning System (GPS) technology or an indoor positioning system (e.g., using Wi-Fi infrastructure) to determine the current location of the mobile device 230, and thus the user 220. This current location may then be used as the starting location.

In some embodiments, the navigation module 210 may compare image data obtained from the mobile device 230 with location image information 280 in the database(s) 250 to determine the current location of the mobile device. For example, the user 220 may take a still picture or video of a portion of his or her current location using the mobile device 230. This image data may then be sent to the navigation module 210, which may search through stored images of locations to find an image that is sufficiently similar to the image data obtained by the user 220. If a stored image (e.g., a still image or video) if determined to have a similarity measurement that meets a predetermined threshold, then it may be determined that the location corresponding to the stored image is the same location corresponding to the image data obtained by the user 220. This location may then be used as the starting location, or as the current location of the user 220 or mobile device 230 in other applications, which will be discussed in further detail below. The stored images and their corresponding locations may be obtained and provided to the navigation system 200 by users 210 using their mobile devices 230.

The navigation module 210 may enable the user 220 to establish a route from the starting location to the destination using the mobile device 230. The navigation module 210 may track the movement of the user 220, via the movement of the mobile device 230 being carried by the user 220, from the starting location to the destination. The movement of the mobile device 230 may be tracked in a variety of ways. In some embodiments, the location and movement of the mobile device 230 may be tracked using any one or combination of GPS technology, an indoor positioning system (e.g., using Wi-Fi infrastructure), an accelerometer on the mobile device 230, and an altimeter on the mobile device 230. For example, Wi-Fi access points may be used to determine the starting location of the mobile device 230. The accelerometer and the altimeter may then be used to determine horizontal and vertical movement (moving up and down floors of a building), respectively, of the mobile device 230 until it reaches the destination. It is contemplated that other ways of tracking the movement of the mobile device 230 are also within the scope of the present disclosure.

The navigation module 210 may determine that the mobile device 230 has arrived at the destination in a variety of ways. In some embodiments, the navigation module 210 may receive an indication from the user 230 that he or she has reached the destination, such as by the user selecting a selectable button on the user interface on the mobile device 230 indicating arrival at the destination. In some embodiments, the navigation module 210 may compare the current location of the mobile device 230 with the known destination to determine if they are the same, which would indicate that the mobile device 230 has arrived at the destination. In some embodiments, indication of arrival at the destination may be provided in the form of a lack of movement of the mobile device 230 for a predetermined amount of time (e.g., the mobile device has not moved more than two feet in the last twenty seconds). It is contemplated that other ways of determining that the mobile device 230 has arrived at the destination are also within the scope of the present disclosure.

As the user 220 travels from the starting location to the destination, he or she may obtain image data using the mobile device 230. Examples of image data may include, but are not limited to, still pictures taken with a camera on the mobile device 230 and video taken with a camcorder on the mobile device 230. The image data may then be sent to the navigation module 210, which may store the image data along with its corresponding location in the database(s) 250. The navigation module 210 may determine the corresponding location of the image data (i.e., where the image data was obtained by the mobile device 230) by using its tracking of the mobile device 230. The navigation module 210 may be configured to store destination route information 260 in the database(s) 250 for subsequent display to other users 220. This destination route information 260 may detail the route established by the user 220.

FIG. 3 illustrates destination route information 260 that may be stored in a database, in accordance with an example embodiment. The destination route information 260 may be stored as records or as other data structures. As seen in FIG. 3, the destination route information 260 may comprise destination information 310, starting location information 320, and route information 330. The destination information 310 may identify a destination within an area to which the navigation system 200 is to apply (e.g., each destination point in an office building). If a route has been established to a destination, then the starting location information 320 may identify the starting location of the route to the corresponding destination, and the route information may comprise details of the route from the starting location of the destination. The route details may include, but are not limited to, the path or directions from the starting location to the destination. It is contemplated that other configurations of the destination route information 260 are within the scope of the present disclosure.

In the example provided in FIG. 3, no route has been established yet for Destination A, therefore, there is no corresponding staring location information 320 or route information 330. For Destination B, a corresponding Route B has been established from Starting Location B. For Destination C, three routes have been established. Route C has been established from Starting Location C to Destination C, while Route D has been established from Starting Location D to Destination C. However, it is contemplated that more than one route may be established from a single starting location to a single destination. In FIG. 3, a second route, Rout E, has been established from Starting Location D to Destination C.

In some embodiments, the destination route information 260 may comprise pioneer information 340, which may identify the user 220 who established a route. In FIG. 3, User B established Route B from Starting Location B to Destination B, User C established Route C from Starting Location C to Destination C, as well as Route D from Starting Location D to Destination C, and User E established Route E from Starting Location D to Destination C.

In some embodiments, incentives may be provided to encourage users 220 to establish routes to destinations. The navigation module 210 may reward users 220 for pioneering routes to a destination. In some embodiments, the navigation module 210 may be configured to store a value total for each user 220, and add value to the user's value total in response to the user establishing the route from the starting location to the destination. In some embodiments, the value may comprise points. However, it is contemplated that other forms of value are within the scope of the present disclosure. If no routes at all have been established for a destination, then an even greater value may be awarded to a user 210 who establishes a route to the destination than if a route has already been established to the destination.

FIG. 4 illustrates user information 270 that may be stored in database(s) 250, in accordance with an example embodiment. The user information 270 may comprise an identification of users 410 and the corresponding value totals 420 for each user 220. In FIG. 4, the value totals 420 are labeled as "Pioneering Points." Here, User A and User D have zero points, indicating that they have not yet established any routes. User B and User E have five points each, and User C has ten points, indicating that they have each established routes, but that User C has established more routes or more important routes than User B and User E.

In some embodiments, a user 220 may capture image data using a mobile device 230 while traveling from a starting location to a destination, such as while the user 220 is establishing a route from the starting location to the destination. It is contemplated that the image data may be captured at other times as well, such as when the user 220 is not establishing the route. The image data may be captured using a built-in camera or camcorder on the mobile device 230. The image data may be sent to the navigation module 210. The navigation module 210 may also receive or otherwise determine location information corresponding to the received image data (e.g., where the image data was captured by the mobile device 230). The received image data and the corresponding location information may be stored as location image information 280 on the database(s) 250.

FIG. 5 illustrates location image information 280 that may be stored in database(s) 250, in accordance with an example embodiment. The location image information 280 may comprise an identification of a location 510 and one or more images 520 corresponding to the location 510. These images 520 may comprise image files (e.g., JPEG files). In FIG. 5, Image 1 has been captured at or near Location A, and has been stored in a corresponding fashion with Location A. No image has been captured at or near Location B, or at least has not been stored in a corresponding fashion with Location B. Image 2 and Image 3 have been captured at or near Location C, and have been stored in a corresponding fashion with Location C. Image 4 has been captured at or near Location D, and has been stored in a corresponding fashion with Location D. Image 5, Image 6, and Image 7 have been captured at or near Location E, and has been stored in a corresponding fashion with Location E.

The navigation module 210 may be configured to enable the user 220 to establish the route from the starting location to the destination in a variety of ways. As previously discussed, the navigation module 210 may track the movement of the user 220, via the movement of the mobile device 230 being carried by the user 220, from the starting location to the destination. The user 220 may obtain image data using the mobile device 230 as he or she travels from the starting location to the destination. This image data may be sent from the mobile device 230 to the navigation module 210, where it may be stored in corresponding fashion with location information identifying the corresponding location where the received image data was obtained by the mobile device 230, as shown in FIG. 5. For example, on the user's way from his office to the conference room, he may pass the office kitchen. The user may take a still picture or video of the kitchen as he passes it. This image data may be sent to the navigation module 210, which may then determine the location or vicinity in which the image data was captured—near the kitchen, in this case—and store this image data of the kitchen in the database(s) 250 along with an identification of this image data as corresponding to the kitchen or the kitchen's vicinity. When the navigation module 210 receives the image data from the mobile device 230, it may determine where the image data was captured based on its tracking of the movement of the mobile device 230, as previously discussed.

Figure 6A:
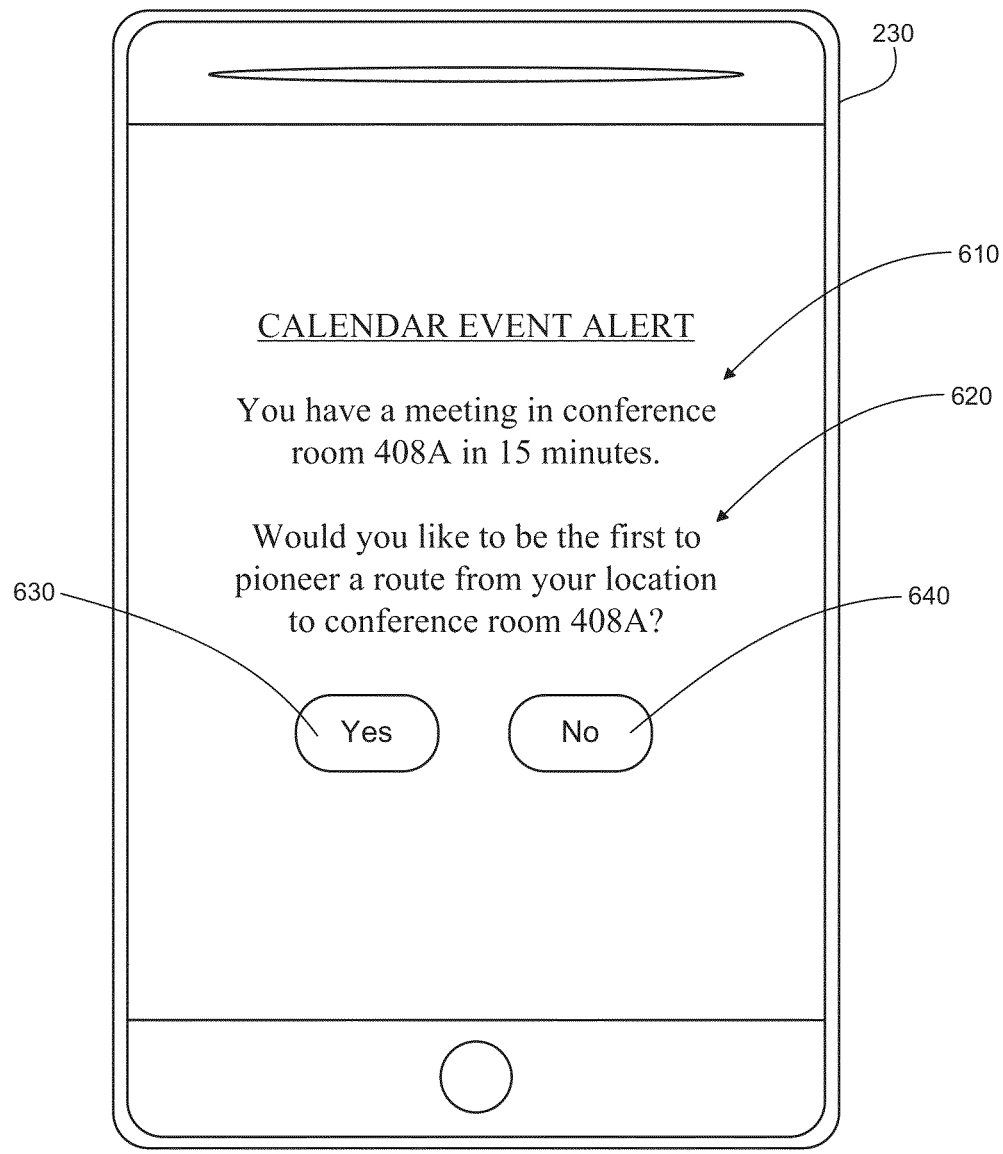
FIGS. 6A-6C illustrate user interface elements displayed on a mobile device during a navigation process.
Figure 6B:
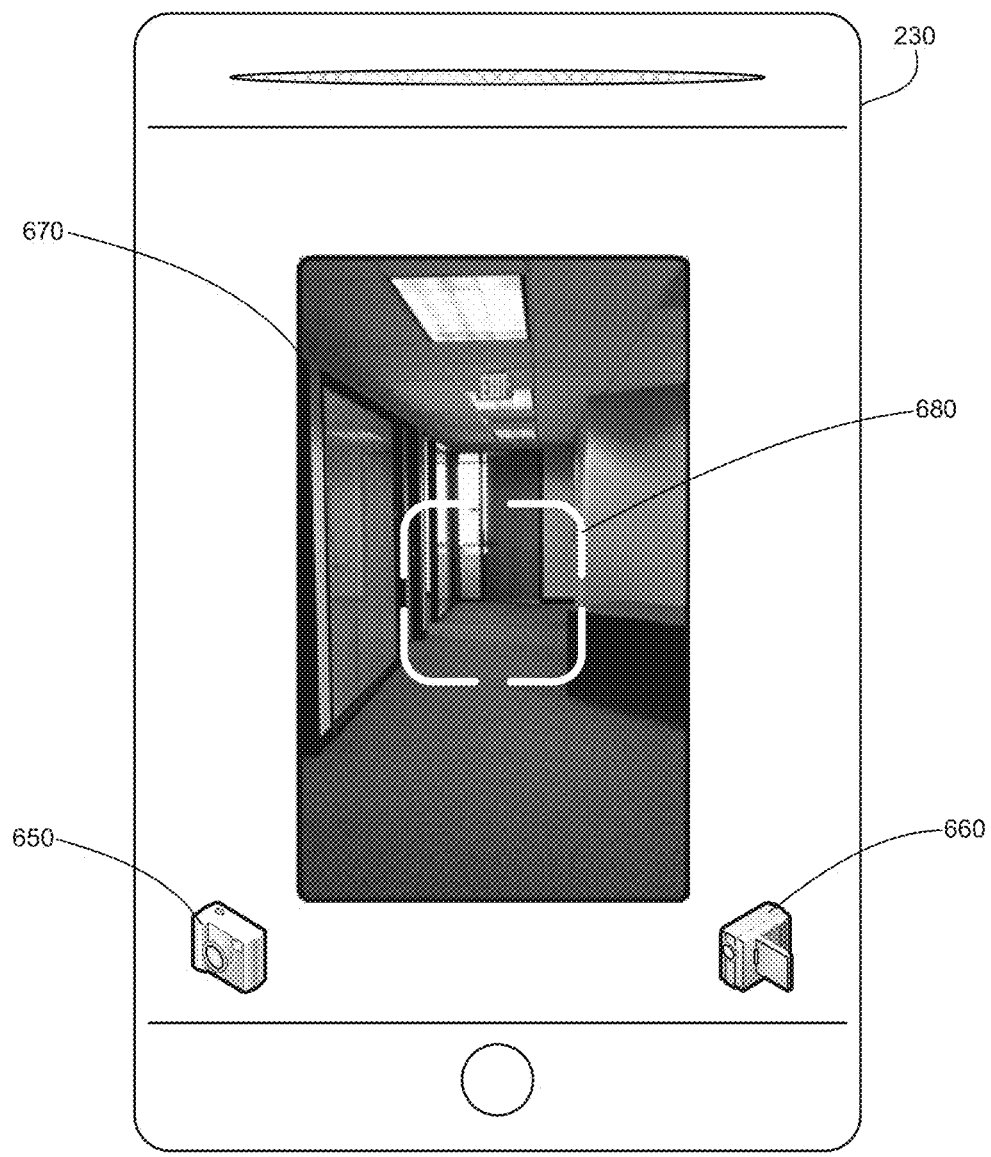
Figure 6C:
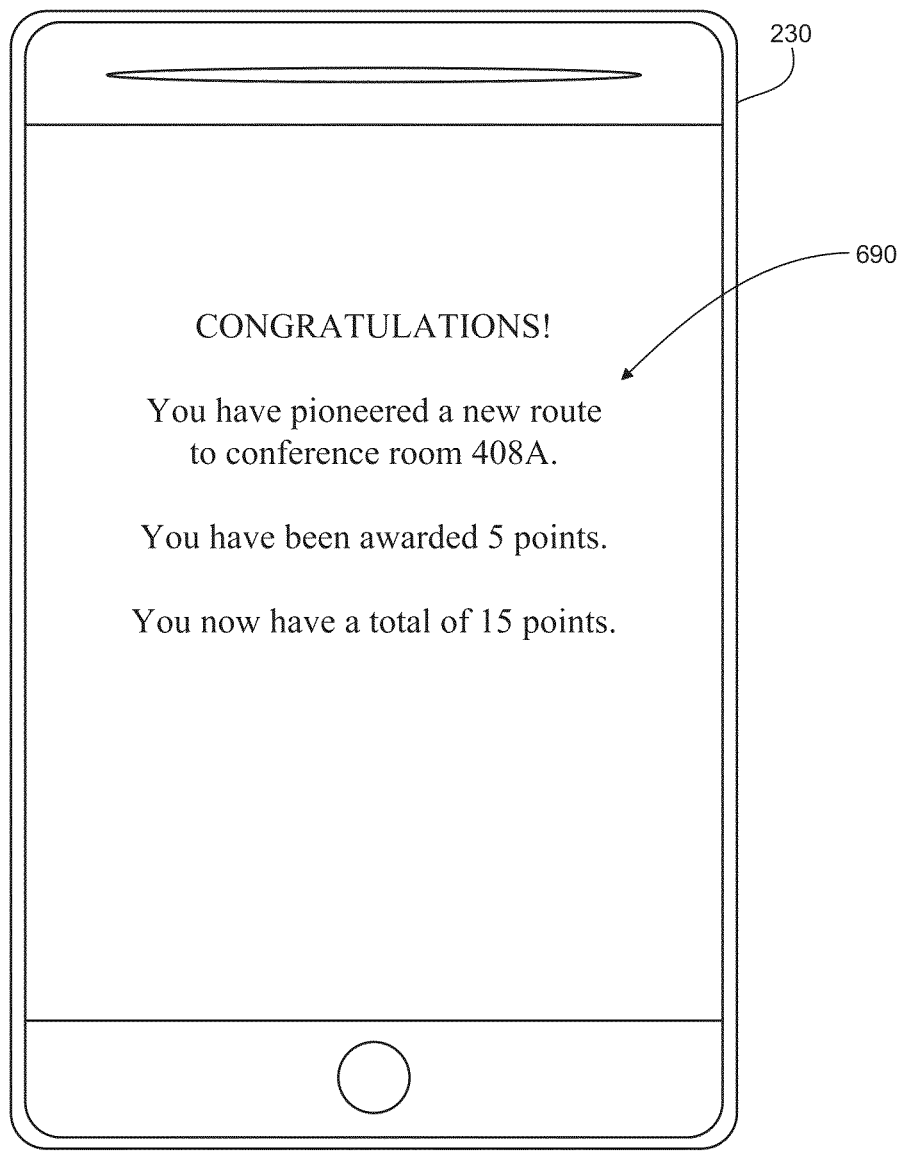

FIGS. 6A-6C illustrate user interface elements displayed on a mobile device 230 during a navigation process. During this navigation process, the user 220 may establish a route from a starting location to a destination, as well as capture and upload image data of locations or points of interest along the way.

In FIG. 6A, a notification 610 of a calendar event may be displayed to the user 220 on the mobile device 230. This calendar event may identify a destination for the navigation process. For example, in FIG. 6A, the notification 610 reads, "You have a meeting in conference room 408A in 15 minutes." This notification identifies "conference room 408A" as a potential destination. In some embodiments, the navigation module 210 may be in communication with calendaring software so that it may receive details of this calendar event and the potential destination. The navigation module 210 may determine whether a route to this destination has been established and stored in the database(s). In some embodiments, the navigation module 210 may determine whether a route to this destination from the user's current location (i.e., the starting location) has been established and stored in the database(s). If no route to the destination has been established and stored yet, or if no route from the user's current location to the destination has been established yet, then the user may be prompted to establish such a route. In FIG. 6A, the user 220 is prompted to establish a route to the destination—here, conference room 408A—via a prompting message 620. In FIG. 6A, the prompting message 620 reads, "Would you like to be the first to pioneer a route from your location to conference room 408A?" The user 220 may then begin the process of establishing the route by selecting a button indicating a desire to establish the route, such as a selectable "Yes" button 630 in FIG. 6A, or may decline the opportunity to establish the route by selecting a button indicating a desire not to establish the route, such as a selectable "No" button 640 in FIG. 6A. It is contemplated that other input mechanisms may be employed to enable the user to select a course of action.

In FIG. 6B, the user 220 has selected to establish the route. Here, the user's engagement with this route establishment process may be indicated on the mobile device 230 (e.g., by displaying "PIONEERING MODE" on the mobile device 230). As the user 220 travels from the starting location to the destination, the navigation module 210 may track and record the user's path via the movement of the mobile device 230 being carried by the user 220. Along the way, the user 220 may capture image data of the route using the mobile device 230. In some embodiments, the user 220 may use a camera or camcorder on the mobile device 230 to capture the image data, such as by selecting a camera mode by selecting a camera icon 650 or by selecting a camcorder mode by selecting a camcorder icon 660, respectively. It is contemplated that other input mechanisms may be employed to enable the user 220 to control what type of image data is to be captured along the route. The user 220 may view a portion of the route that is in his or her line of sight via a viewer 670 displayed on the mobile device 230. The viewer 670 may comprise a reticle or focus marks 680 to help focus potential image data in the viewer 670. Image data, such as still pictures and video, may then be captured along the route to the destination, and sent to the navigation module 210, which may then store the image data along with its corresponding location information in database(s) 250.

In FIG. 6C, the navigation module 210 has determined that the user 220 has arrived at the destination and that, therefore, the route has been completed. The navigation module 210 may then store the destination route information 260 for the route in the database(s) 250. A notification 690 may be displayed on the mobile device 250 indicating to the user 220 that he or she has successfully established a route to the destination. In FIG. 6C, the notification reads, "You have pioneered a new route to conference room 408A." As previously discussed, the navigation module 210 may add value to the user's value total in response to the user 220 successfully establishing a route. The navigation module 210 may notify the user 220 of how much value (e.g., points) the user 220 has been awarded for establishing the route, as well as the user's value total (e.g., how many total points the user currently has). For example, in FIG. 6C, the notification 690 indicates to the user 220 that he or she has been awarded five points and that the user 220 has fifteen points total.

In some embodiments, the navigation module 210 may be configured to cause route information established by one user 220 to be displayed on another user's mobile device 230. The navigation module 210 may provide directions/instruction on how to get from the user's current location (i.e., the starting location) to the user's desired destination. The navigation module 210 may track the movement of the user's mobile device 230 as the user 220 follows these directions from the starting location to the destination.

In some embodiments, the user 220 may not know his or her current location. In some embodiments, standard GPS and indoor positioning (e.g., using Wi-Fi access points) techniques may not be currently available to the user's mobile device 230 and/or to the navigation module 210. In some embodiments, the navigation module 210 may determine the user's current location using image data captured by the user's mobile device 230.

Figure 7A:
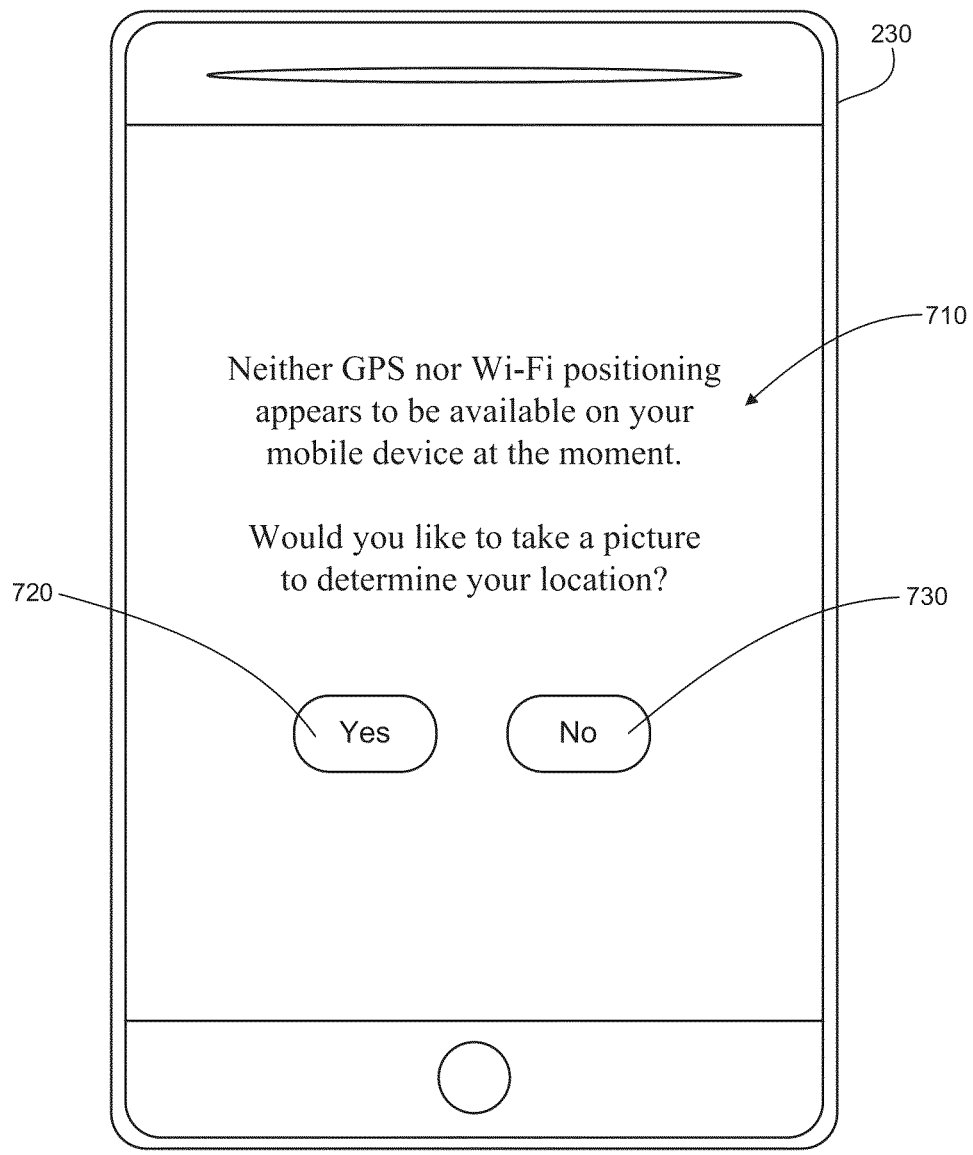
FIGS. 7A-7E illustrate user interface elements displayed on a mobile device during another navigation process.
Figure 7B:
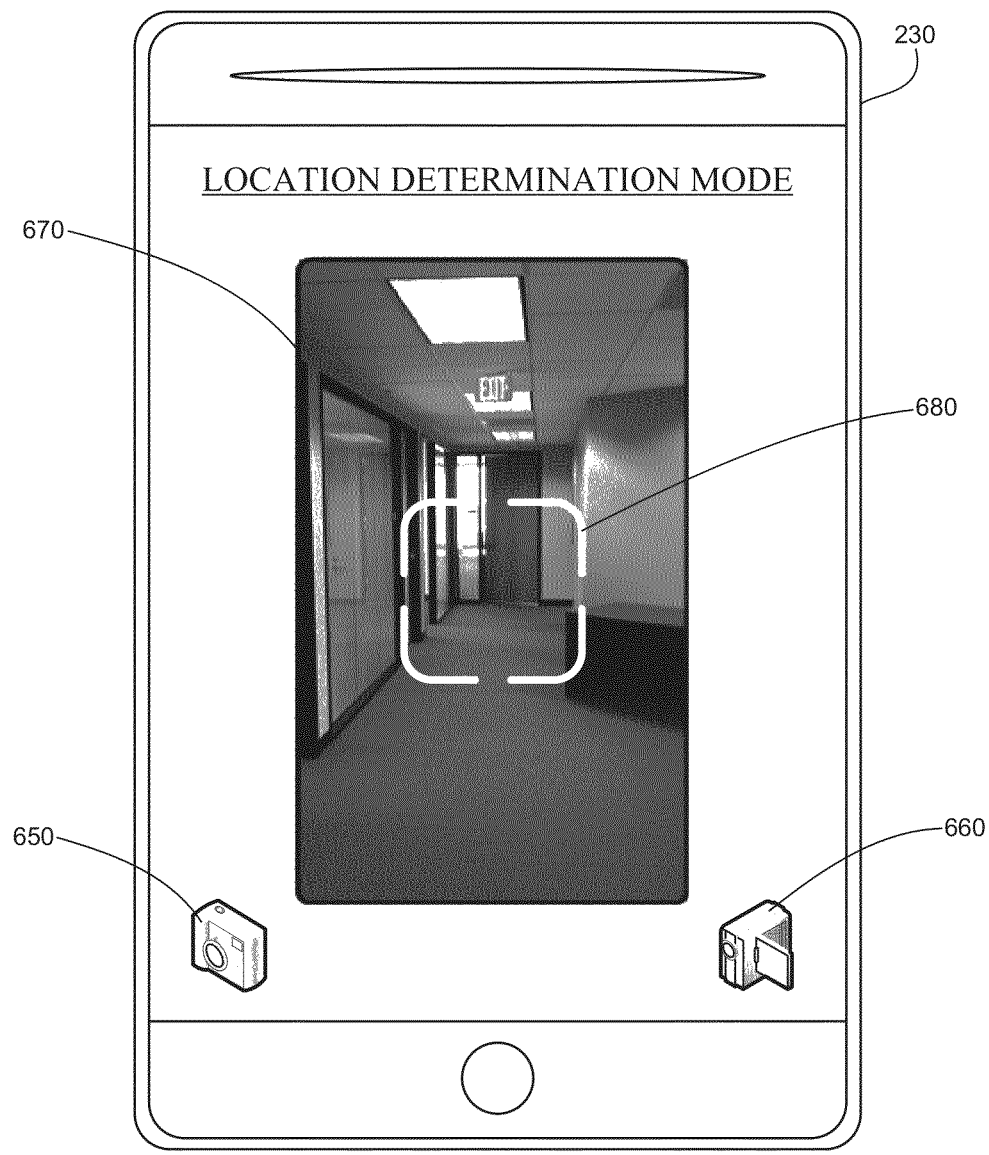

FIGS. 7A-7E illustrate user interface elements displayed on a mobile device 230 during a navigation process. In FIG. 7A, the navigation module 210 may determine that the user's current location cannot be determined using certain positioning means (e.g., GPS or Wi-Fi positioning). In response to this determination, the navigation module 210 may cause a notification 710 to be displayed on the mobile device 230 to indicate to the user 230 that such positioning means does not appear to be currently available. The notification 710 may prompt the user 220 to decide whether he or she would like to capture image data using the mobile device 230 and have the current location determined using the captured image data. In FIG. 7A, the user 220 is presented with selectable "Yes" and "No" buttons 720 and 730, respectively, which he or she may select to make this decision.

If the user 220 decides to have his or her current location determined based on captured image data, the navigation module 210 may cause the viewer 670 to be displayed on the mobile device 230 so that the user 220 may capture image data, such as a still picture using a camera mode or video using a camcorder mode. As before, the user 220 may select camera mode or camcorder mode via selectable icons 650 and 660, or via other input mechanisms. The navigation module 210 may provide an indication to the user 220 that it is ready for image data to be captured using the mobile device 230 (e.g., by displaying "LOCATION DETERMINATION MODE" on the mobile device 230). The user 220 may capture image data using an image capture device (e.g., camera or camcorder) on the mobile device 230, and send the image data to the navigation module 210. The navigation module 210 may then compare the captured image data with stored image data. The stored image data may be image data captured by other users during establishment of routes during a time outside the context of the establishment of routes. If the navigation module 210 determines that the captured image data meets a predetermined threshold for similarity with one of the stored image data, then the location corresponding to that similar stored image data may be determined to be the current location of the mobile device 230, and thus the user 220. The navigation module 210 may cause a notification 740 of the user's current location to be displayed on the mobile device 230.

Figure 7C:
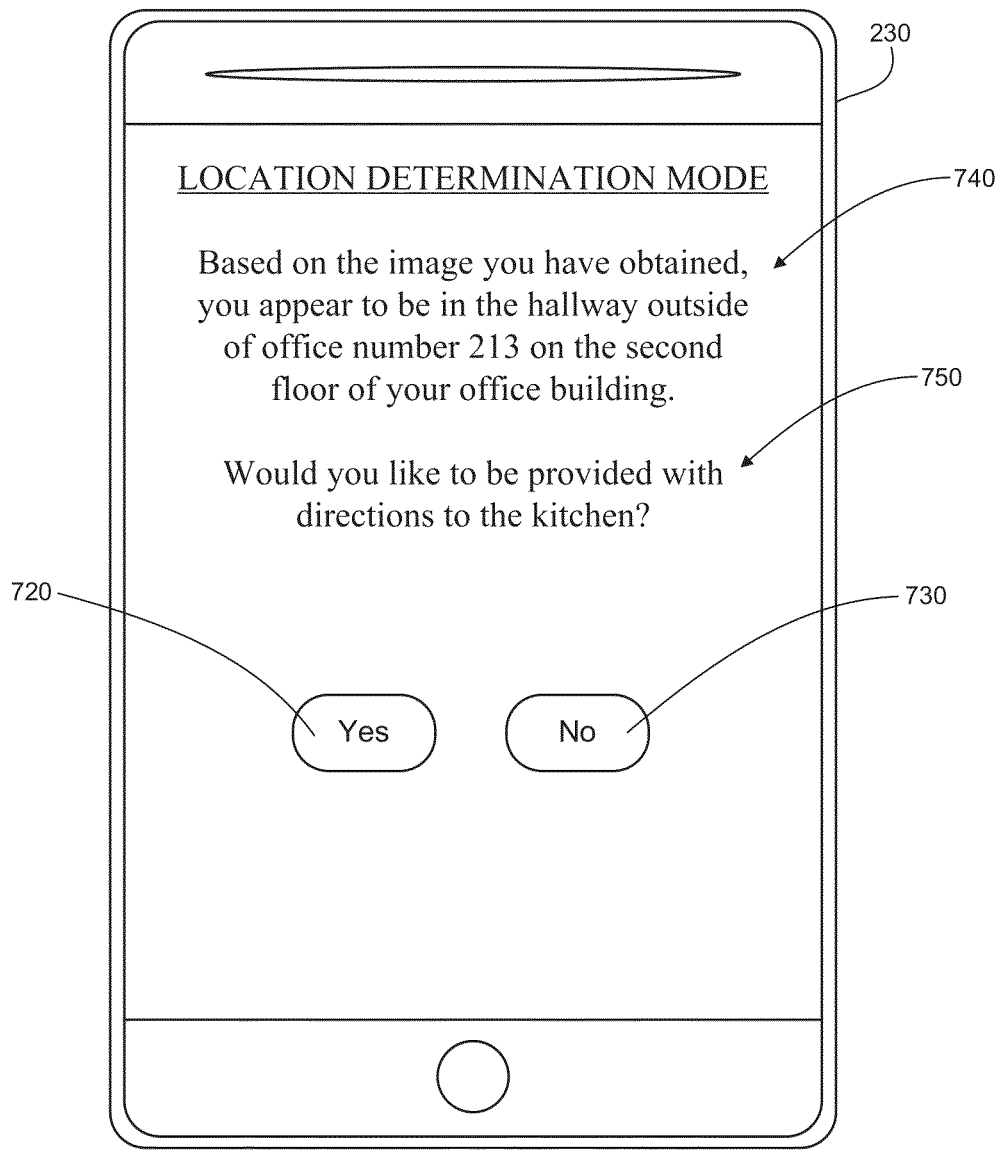

The navigation module 210 may then prompt the user 220 to decide if he or she would like to be provided with navigation directions to a particular destination. For example, the navigation module 210 may cause a prompting message 750 to be displayed on the mobile device 230. The prompting message 750 may ask the user 220 to make this decision. In FIG. 7C, the user 220 is presented with selectable "Yes" and "No" buttons 720 and 730, respectively, which he or she may select to make this decision.

Figure 7D:
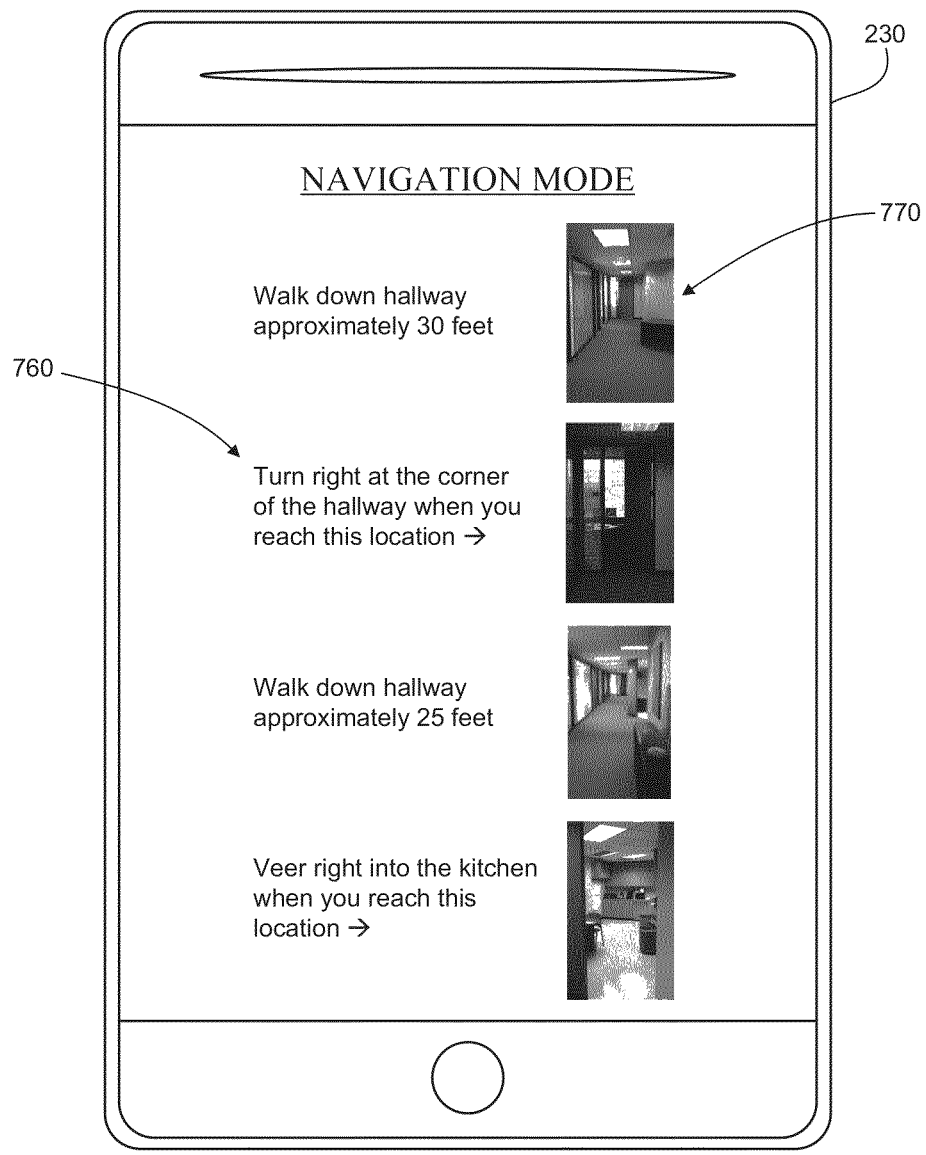

In some embodiments, the user 220 may decide to be provided with navigation directions. In response, the navigation module 210 may use the user's current location, which it just determined, in determining and providing the route to the user 220. The navigation module 210 may search through the destination route information 260 in database(s) 250 to find a route that corresponds to the user's desired destination and the user's current location. If such a route is found, then the corresponding route information may be provided to the user 220. In FIG. 7D, the navigation module 210 causes route information to be displayed on the mobile device 220. This route information may include, but is not limited to, directions 760 and an image 770 corresponding to the directions 760. For example, the route information may include a direction 760 to the user to walk down the hallway approximately thirty feet, as well as an image 770 of the hallway. In another example, the route information may include a direction 760 to the user to turn right at the corner of the hallway when he or she reaches a specific location identified by an image 770 of that location.

Figure 7E:
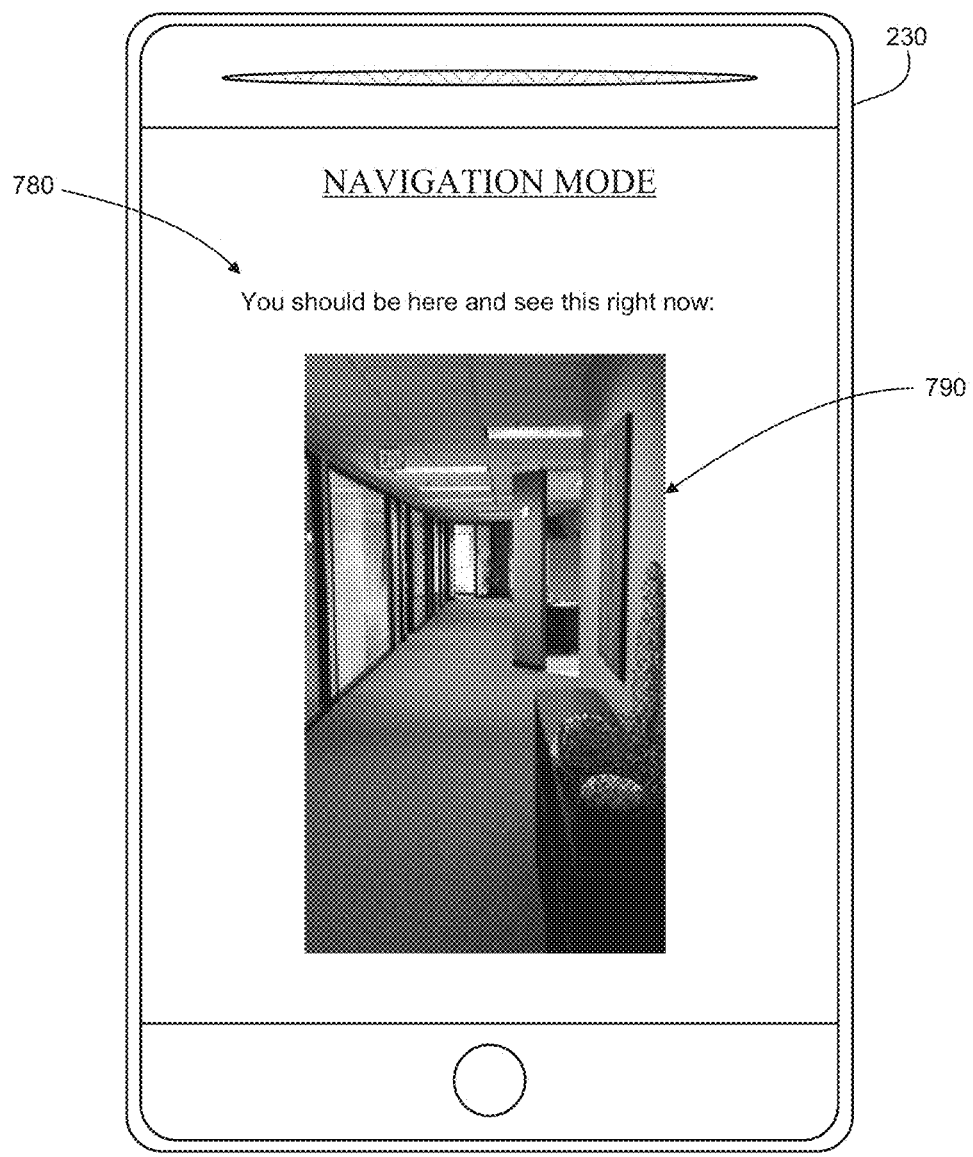

In some embodiments, the navigation module 210 may determine that the mobile device 230, and thus the user 220, is at or within the vicinity of a specific location based on its tracking of the movement of the mobile device 230. The navigation module 210 may determine if it has access to image data corresponding to this specific location and, if it does, cause the image data corresponding to this specific location to be displayed on the mobile device 230. In FIG. 7E, while the user 220 is following navigation directions from the navigation module 210, the navigation module 210 may cause a notification message 780 to be displayed indicating that the user should be at a certain location and/or see a certain location, along with an image 790 of that certain location.

In some embodiments, the navigation module 210 may be configured to cause image data corresponding to an upcoming location along the route the user 220 is taking to be displayed along with a notification prior to the user arriving at that location. The notification may be configured to notify the user 220 that the displayed image data represents a view that will be viewable to other user 220 along the route from the starting location to the destination. In some embodiments, the notification may be configured to notify the user 220 that the displayed image data represents the next waypoint along the route to the destination, thereby giving the user 220 advance notice of what he or she should be seeing shortly along the route.

Figure 8:
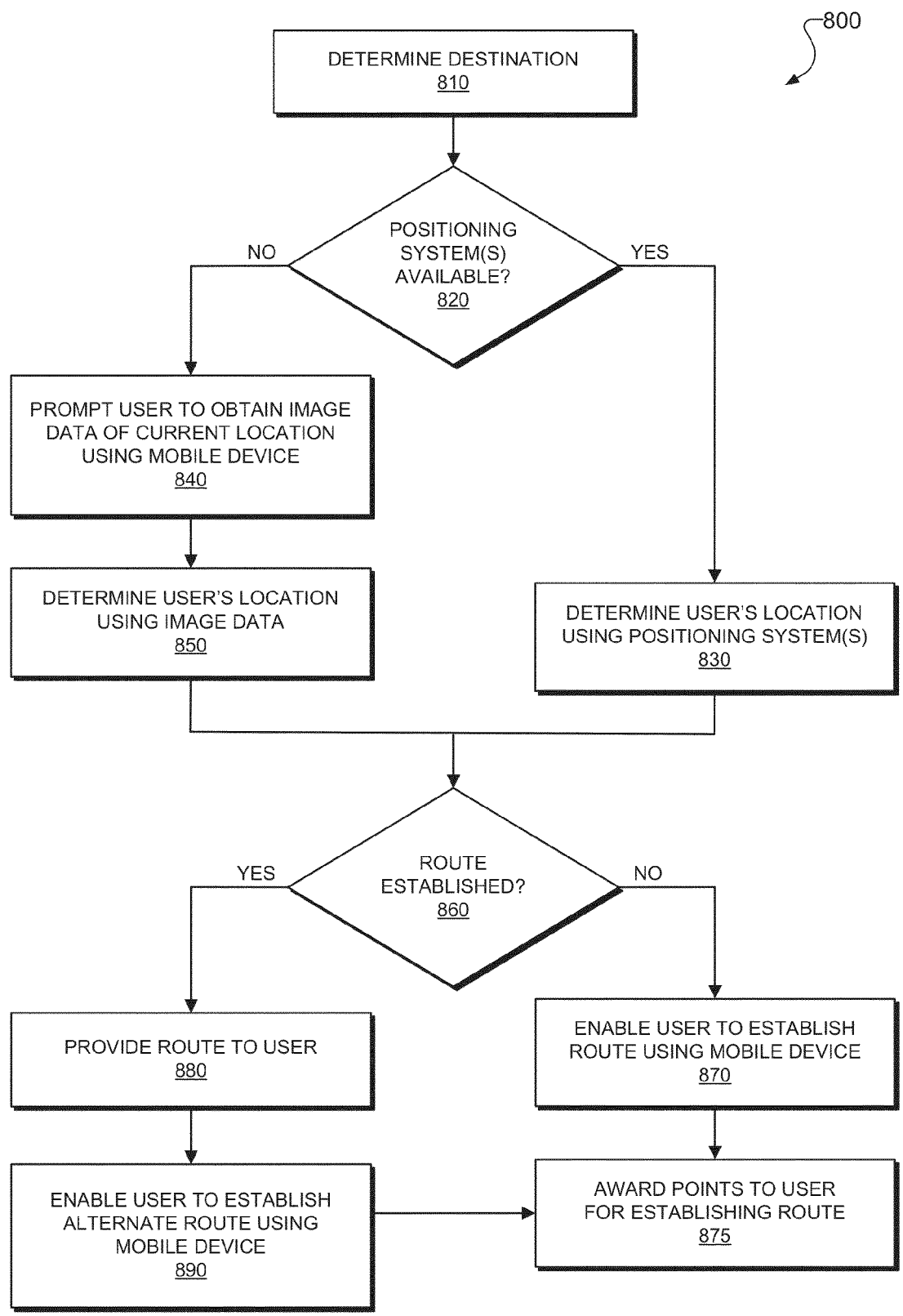
FIG. 8 is a flowchart illustrating a navigation method, in accordance with an example embodiment.

FIG. 8 is a flowchart illustrating a navigation method 800, in accordance with an example embodiment. It is contemplated that the operations of method 800 may be performed by a system or modules of a system (e.g., navigation system 200 and navigation module 210 in FIG. 2).

At operation 810, a destination for a route may be determined. In some embodiments, the destination may be determined based on a user 220 specifying the destination or by using location information from a calendar event of a calendaring application. However, it is contemplated that the destination may be determined in other ways as well.

At operation 820, a determination may be made as to whether certain positioning systems are available for determining the current location of the user 220. Such positioning systems may include, but are not limited to, GPS systems and indoor positioning systems (e.g., positioning systems using Wi-Fi infrastructure). If it is determined that one or more of the positioning systems is available, then the user's current location may be determined, at operation 830, using the available positioning system(s). If it is determined that none of the positioning systems are available, then the user 220 may be prompted on the mobile device 230, at operation 840, to obtain image data of his or her current location using the mobile device 230. The user 220 may then capture image data (e.g., by taking a still picture or video) using his or her mobile device 230. At operation 850, the captured image data may then be used to determine the user's current location, e.g., by comparing the captured image data with stored image data that corresponds to certain locations, as previously discussed.

At operation 860, it may be determined whether a route has been established to the determined destination or, more specifically, whether a route has been established to the determined destination from the determined starting location of the user (i.e., the user's current location).

If it is determined that a route has not been established, then the user 220 may be enabled, at operation 870, to establish a route to the destination using his or her mobile device 230, as previously discussed. In some embodiments, the user 220 may capture image data that corresponds to the route he or she is establishing. This captured image data may be stored along with the corresponding details of the route established by the user 220. In response to the user 220 establishing the route, the user 220 may be awarded points or some other value at operation 875.

If it is determined, at operation 860, that a route has been established, then the route may be provided to the user 220, as previously discussed. In some embodiments, even if a route has already been established, the user 220 may be enabled, at operation 890, to establish an alternate route. In response to the user 220 establishing the alternate route, the user 220 may be awarded points or some other value at operation 875. The user 220 may be awarded more points or value for establishing a route for a destination or combination of destination and starting location for which no route had yet been established and stored. However, it is contemplated that other point/value awarding schemes are also within the scope of the present disclosure.

It is contemplated that any of the other features described within the present disclosure may be incorporated into method 800.

Figure 9:
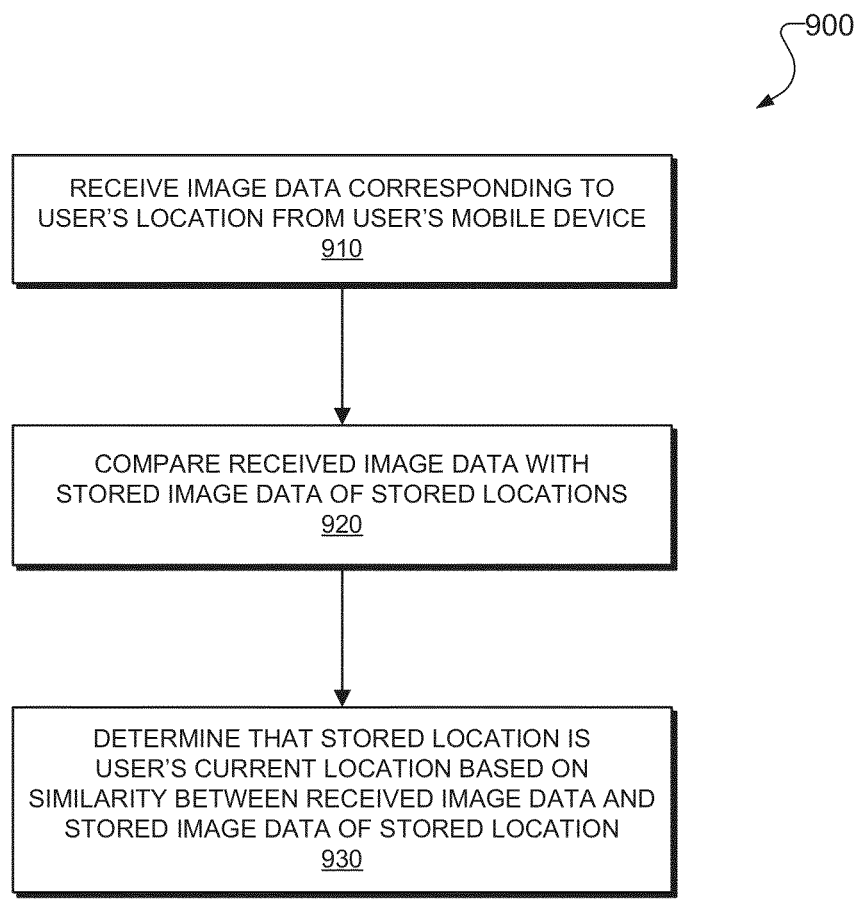
FIG. 9 is a flowchart illustrating a method of determining a user's location using image data, in accordance with an example embodiment.

FIG. 9 is a flowchart illustrating a method 900 of determining a user's location using image data, in accordance with an example embodiment. It is contemplated that the operations of method 900 may be performed by a system or modules of a system (e.g., navigation system 200 and navigation module 210 in FIG. 2).

At operation 910, image data corresponding to the user's current location may be received from the user's mobile device 230. This image data may comprise still picture data or video data that has been captured via a built-in camera or camcorder on the mobile device 230.

At operation 920, the received image data may be compared with stored image data of stored locations. For example, the received image data may be compared with the images 520 of the location image information 280 stored in the database(s) 250.

At operation 930, it may be determined that one of the stored locations 510 in the location image information is the user's current location based on a measurement of the similarity between the received image data and the stored image data corresponding to the determined stored location 510 meeting a predetermined threshold.

It is contemplated that any of the other features described within the present disclosure may be incorporated into method 900.

Figure 10:
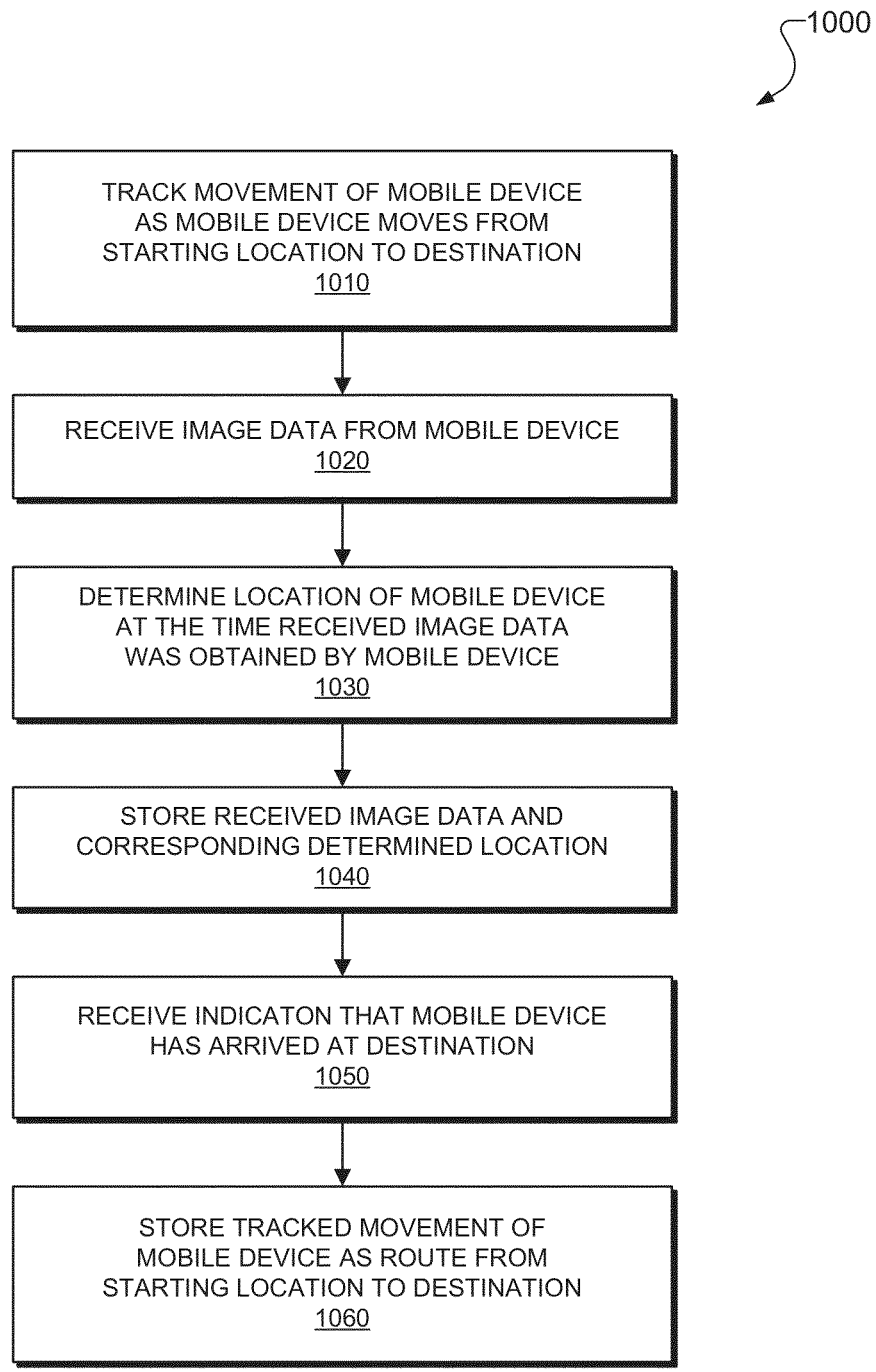
FIG. 10 is a flowchart illustrating a method of enabling a user to establish a route using a mobile device, in accordance with an example embodiment.

FIG. 10 is a flowchart illustrating a method 1000 of enabling a user to establish a route using a mobile device, in accordance with an example embodiment. It is contemplated that the operations of method 1000 may be performed by a system or modules of a system (e.g., navigation system 200 and navigation module 210 in FIG. 2).

At operation 1010, the movement of the user's mobile device 230 may be tracked as the mobile device 230 is carried by the user 220 from a starting location to a destination. The movement may be tracked in a variety of ways, including, but not limited to, the use of GPS technology, indoor positioning technology (e.g., using Wi-Fi access points), an accelerometer on the mobile device 230, and/or an altimeter on the mobile device 230. It is contemplated that other ways of tracking the movement of the mobile device 2230 are also within the scoped of the present disclosure.

At operation 1020, image data of a location may be received from the mobile device 230. The image data may include, but is not limited to, still picture data and/or video data.

At operation 1030, the location of the mobile device 230 at the time the image data was obtained by the mobile device 230 may be determined. This determination may be made based on the tracked movements of the mobile device 230.

At operation 1040, the received image data and the corresponding determined location may be stored in the database(s) 250. The association between the received image data and its corresponding location may be stored.

At operation 1050, an indication that the mobile device has arrived at the destination may be received. As previously discussed, the mobile device's arrival at the destination may be determined in a variety of ways. In some embodiments, an indication may be received from the user 230 that he or she has reached the destination, such as by the user selecting a selectable button on the user interface on the mobile device 230 indicating arrival at the destination. In some embodiments, a comparison of the current location of the mobile device 230 with the known destination may be made to determine if they are the same, which would indicate that the mobile device 230 has arrived at the destination. In some embodiments, indication of arrival at the destination may be provided in the form of a lack of movement of the mobile device 230 for a predetermined amount of time (e.g., the mobile device has not moved more than two feet in the last twenty seconds). It is contemplated that other ways of determining that the mobile device 230 has arrived at the destination are also within the scope of the present disclosure.

At operation 1060, in the tracked movement of the mobile device 230 from the starting location to the destination may be stored as the route from the starting location to the destination. The route may be stored as one continuous path or as a series of waypoints that may be used later to provide directions to other users 220 for how to get from the corresponding starting location to the corresponding destination. The route may be stored in other forms as well.

It is contemplated that any of the other features described within the present disclosure may be incorporated into method 1000.

Figure 11:
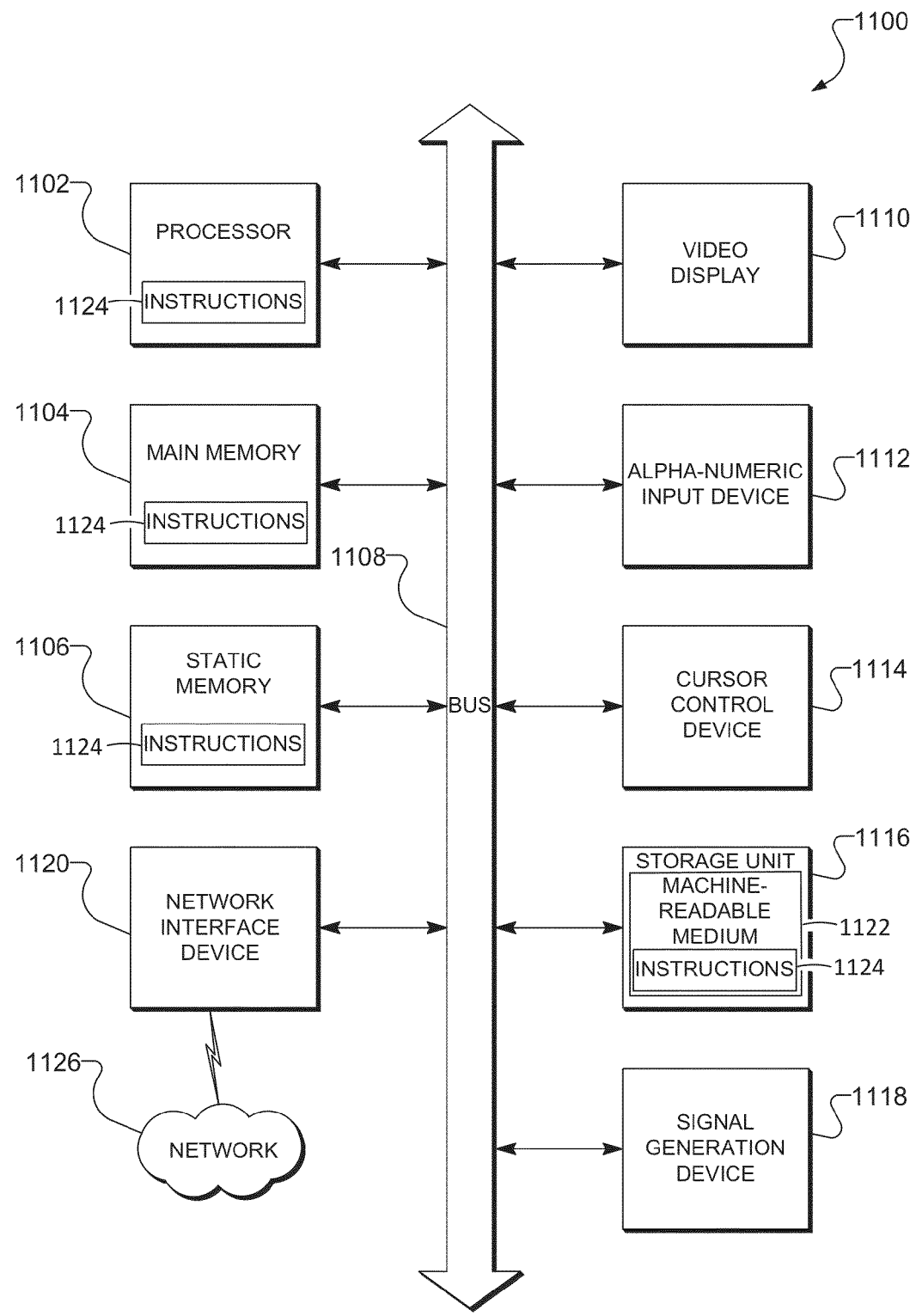
FIG. 11 is a block diagram of a machine in the example form of a computer system within which instructions for causing the machine to perform any one or more of the methodologies discussed herein may be executed.

FIG. 11 is a block diagram of a machine in the example form of a computer system 1100 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a storage unit 1116, a signal generation device 1118 (e.g., a speaker) and a network interface device 1120.

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1202 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1124 may further be transmitted or received over a communications network 1126 using a transmission medium. The network 1126 may be one of the networks 1120. The instructions 1124 may be transmitted using the network interface device 1120 and any one of a number of well-known transfer protocols (e.g., Hyper Text Transfer Protocol (HTTP)). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining a destination for a user;
   determining a starting location for the user using data obtained via a mobile device of the user;
   enabling, by at least one processor, the user to establish a route from the starting location to the destination using the mobile device, the enabling of the user to establish the route comprising:
      tracking movement of the mobile device as the mobile device moves from the starting location to the destination;
      receiving image data from the mobile device, the image data being obtained by the mobile device between the starting location and the destination;
      determining an image location corresponding to where the received image data was obtained by the mobile device; and
      storing the received image data and the determined image location in a database; and
   storing route information that details the established route in the database for subsequent display to other users.

2. The method of claim 1, further comprising:
   storing a value total for each user; and
   adding value to the user's value total in response to the user establishing the route from the starting location to the destination.

3. The method of claim 1, wherein determining the starting location of the user comprises:
   receiving image data from the mobile device;
   comparing the received image data with stored image data corresponding to a stored location; and determining that the stored location is the starting location based on a measure of similarity between the received image data and the stored image data.

4. The method of claim 1, wherein the movement of the mobile device is tracked using at least one of a WiFi positioning system, an accelerometer on the mobile device, and an altimeter on the mobile device.

5. The method of claim 1, further comprising:
causing the route information to be displayed on another user's mobile device;
tracking movement of the other user's mobile device as the other user's mobile device moves from the starting location to the destination;
determining that the other user's mobile device is proximate the image location; and
causing the image data corresponding to the image location to be displayed on the other user's mobile device in response to the determination that the other user's mobile device is proximate the image location.

6. The method of claim 1, further comprising:
causing the route information to be displayed on another user's mobile device;
tracking movement of the other user's mobile device as the other user's mobile device moves from the starting location to the destination; and
causing the image data corresponding to the image location to be displayed along with a notification prior to the other user's mobile device arriving at the image location as the other user's mobile device moves from the starting location to the destination, the notification being configured to notify the other user that the image data represents a view that will be viewable to the other user along the route from the starting location to the destination.

7. The method of claim 1, wherein the destination is inside a building, and the starting location is inside the building.

8. The method of claim 1, wherein the mobile device is a mobile phone having a built-in camera device.

9. A system comprising:
a memory;
at least one processor coupled to the memory;
a navigation module, executable by the at least one processor, configured to:
determine a destination for a user;
determine a starting location for the user using data obtained via a mobile device of the user;
enable the user to establish a route from the starting location to the destination using the mobile device, the enabling of the user to establish the route comprising:
tracking movement of the mobile device as the mobile device moves from the starting location to the destination;
receiving image data from the mobile device, the image data being obtained by the mobile device between the starting location and the destination;
determining an image location corresponding to where the received image data was obtained by the mobile device; and
storing the received image data and the determined image location in a database; and
store route information that details the established route in the database for subsequent display to other users.

10. The system of claim 9, wherein the navigation module is further configured to:
store a value total for each user; and
add value to the user's value total in response to the user establishing the route from the starting location to the destination.

11. The system of claim 9, wherein determining the starting location of the user comprises:
receiving image data from the mobile device;
comparing the received image data with stored image data corresponding to a stored location; and
determining that the stored location is the starting location based on a measure of similarity between the received image data and the stored image data.

12. The system of claim 9, wherein the movement of the mobile device is tracked using at least one of a WiFi positioning system, an accelerometer on the mobile device, and an altimeter on the mobile device.

13. The system of claim 9, wherein the navigation module is further configured to:
cause the route information to be displayed on another user's mobile device;
track movement of the other user's mobile device as the other user's mobile device moves from the starting location to the destination;
determine that the other user's mobile device is proximate the image location; and
cause the image data corresponding to the image location to be displayed on the other user's mobile device in response to the determination that the other user's mobile device is proximate the image location.

14. The system of claim 9, wherein the navigation module is further configured to:
cause the route information to be displayed on another user's mobile device;
track movement of the other user's mobile device as the other user's mobile device moves from the starting location to the destination; and
cause the image data corresponding to the image location to be displayed along with a notification prior to the other user's mobile device arriving at the image location as the other user's mobile device moves from the starting location to the destination, the notification being configured to notify the other user that the image data represents a view that will be viewable to the other user along the route from the starting location to the destination.

15. The system of claim 9, wherein the destination is inside a building, and the starting location is inside the building.

16. The system of claim 9, wherein the mobile device is a mobile phone having a built-in camera device.

17. A non-transitory machine-readable medium embodying a set of instructions that, when executed by a processor, cause the processor to perform operations, the operations comprising:
determining a destination for a user;
determining a starting location for the user using data obtained via a mobile device of the user;
enabling, by at least one processor, the user to establish a route from the starting location to the destination using the mobile device, the enabling of the user to establish the route comprising:
tracking movement of the mobile device as the mobile device moves from the starting location to the destination;
receiving image data from the mobile device, the image data being obtained by the mobile device between the starting location and the destination;
determining an image location corresponding to where the received image data was obtained by the mobile device; and storing the received image data and the determined image location in a database; and storing route information that details the established route in the database for subsequent display to other users.

18. The non-transitory machine-readable medium of claim 17, wherein the operations further comprise:

storing a value total for each user; and adding value to the user's value total in response to the user establishing the route from the starting location to the destination.

* * * * *